(12) United States Patent
Abe (10) Patent No.: US 9,641,757 B2
(45) Date of Patent: May 2, 2017

(54) IMAGE PROCESSING APPARATUS THAT SETS MOVING IMAGE AREA, IMAGE PICKUP APPARATUS, AND METHOD OF CONTROLLING IMAGE PROCESSING APPARATUS

(71) Applicant: CANON KABUSHIKI KAISHA, Tokyo (JP)

(72) Inventor: Takahiro Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 14/803,970

(22) Filed: Jul. 20, 2015

(65) Prior Publication Data

US 2016/0028954 A1    Jan. 28, 2016

(30) Foreign Application Priority Data

Jul. 28, 2014   (JP) ................................ 2014-152911

(51) Int. Cl.
*H04N 5/222*    (2006.01)
*H04N 5/232*    (2006.01)
(Continued)

(52) U.S. Cl.
CPC ..... *H04N 5/23245* (2013.01); *G06F 3/04845* (2013.01); *G06F 3/04847* (2013.01); *G06K 9/34* (2013.01); *H04N 1/0035* (2013.01); *H04N 5/2354* (2013.01); *H04N 5/23216* (2013.01); *H04N 5/23219* (2013.01); *H04N 5/262* (2013.01); *H04N 5/2621* (2013.01); *G06F 2203/04101* (2013.01)

(58) Field of Classification Search
CPC ........ H04N 5/2354; H04N 5/77; H04N 5/772; H04N 5/2352; H04N 5/2355; H04N 5/2356; G06T 2200/21; G06T 2200/28; G06T 2207/10028; G06T 2207/10004; G06T 2207/10024; G06T 2207/20208; G06T 2207/20221; G06T 2207/03; G06T 5/40; G06T 5/50; G06T 5/009
See application file for complete search history.

(56) References Cited

U.S. PATENT DOCUMENTS

2009/0051691 A1*  2/2009 Kimoto .............. A61B 1/00009
                                                345/473
2013/0335596 A1* 12/2013 Demandolx ......... H04N 5/2354
                                                348/231.99

FOREIGN PATENT DOCUMENTS

WO       2013/175051 A1    11/2013

* cited by examiner

*Primary Examiner* — Sinh Tran
*Assistant Examiner* — Selam Gebriel
(74) *Attorney, Agent, or Firm* — Cowan, Liebowitz & Latman, P.C.

(57) ABSTRACT

An image processing apparatus that properly sets a moving image area according to an image. An image processor generates a combined image, by setting one of a plurality of images as a basic image and disposing a moving image generated from the plurality of images in a moving image area which is designated in part of the basic image. The image processor sets a still area in part of the basic image. A system controller causes the basic image to be displayed on a display section. A user performs a touch operation on the display section displaying the basic image, whereby the moving image area is designated. When the moving image area is designated in a manner overlapping the still area, the image processor performs image combining by deleting the overlapping area from the moving image area.

15 Claims, 7 Drawing Sheets

(51) Int. Cl.
*G06K 9/34* (2006.01)
*H04N 5/262* (2006.01)
*G06F 3/0484* (2013.01)
*H04N 1/00* (2006.01)
*H04N 5/235* (2006.01)

MASKING PRIORITY AREA
MOVING IMAGE AREA

FIG. 8C
RELATED ART

IMAGE PROCESSING APPARATUS THAT SETS MOVING IMAGE AREA, IMAGE PICKUP APPARATUS, AND METHOD OF CONTROLLING IMAGE PROCESSING APPARATUS

BACKGROUND OF THE INVENTION

Field of the Invention

The present invention relates to an image processing apparatus that sets a moving image area, an image pickup apparatus, and a method of controlling the image processing apparatus, and more particularly to an image processing apparatus that combines specific areas of an image.

Description of the Related Art

In recent years, in GIF (Graphic Interchange Format) animation or a moving image, there has been known a method of performing visual expression by combining a still image and a moving image such that only part of the still image appears to be moving in the combined image. Here, this image is referred to as a still-and-moving image, and further, an area in which motion occurs in the still-and-moving image is referred to as a moving image area. Further, an area which is still in the still-and-moving image is referred to as a still area. This still area can also be referred to as an area which is masked (masked area).

To generate such a still-and-moving image, for example, there has been proposed a method of displaying areas divided using super pixels, on a display section, and setting a moving image area according to a touch operation on a touch panel (see WO2013/175051). The method disclosed in WO2013/175051 describes that the set moving image area is enlarged according to a user's touch operation.

Figure 8A:
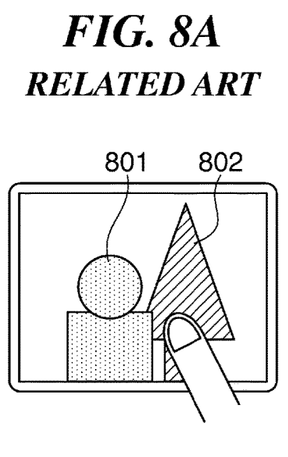
Figure 8B:
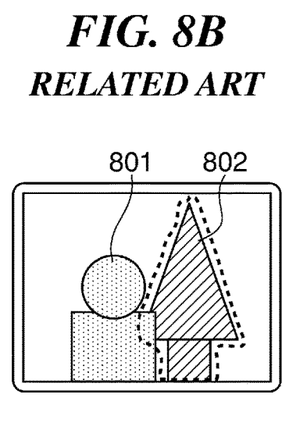
FIG. 8B shows a state of the moving image area set by an erroneous touch operation.
Figure 8C:
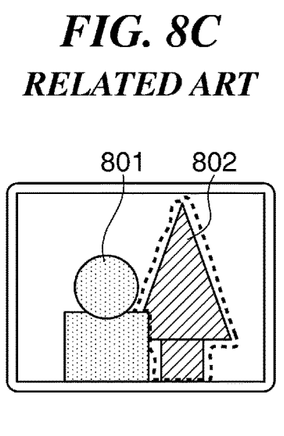
FIG. 8C shows a state a state of the moving image area set by a proper touch operation.

FIGS. 8A to 8C are diagrams useful in explaining how to set a moving image area using the conventional method of generating a still-and-moving image, in which FIG. 8A shows setting of a moving image area, and FIG. 8B shows an erroneous touch operation. Further, FIG. 8C shows a state of the moving image area updated such that an area which is set as part of the moving image area by the erroneous operation is converted to part of the still image area.

In the illustrated example in FIGS. 8A to 8C, it is assumed that an area where a user desires to stop the motion (still area) and the moving image area are close to each other in the image. In this example, a person 801 is set as the still area, and an illumination 802 is set as the moving image area. Further, as for an area other than the person 801 and the illumination 802 (other area), although the user does not intend to set this area as a moving image area, he/she does not care even if any portion of this area is unintentionally touched to set the area as a portion of the moving image area.

Referring to FIG. 8A, to set the illumination 802 as the moving image area, the user touches an area corresponding thereto. By this touch operation, the illumination area is set as the moving image area (see FIG. 8B). In FIG. 8B, an area surrounded by broken lines is the moving image area.

By the way, the touch operation which is an input to the touch panel is a fine operation, and hence unless the user carefully performs the touch operation, the user sometimes touches a portion of an area which the user desires to set as a still area, as shown in FIG. 8B. This makes it impossible to make a setting of the moving image shown in FIG. 8C which is intended by the user. That is, there are cases where it is impossible to produce the still-and-moving image as shown in FIG. 8C in such a manner that the person 801 to be set as a still area is prevented from being set as a moving image area.

However, when setting the moving image area by a touch operation, if an area which the user intends to set as the moving image area and an area which the user intends to set as the still area are close to each other, the user is required to carefully and finely perform the touch operation. This makes it very difficult for the user to perform the touch operation.

SUMMARY OF THE INVENTION

The present invention provides an image processing apparatus that properly sets a moving image area according to an image, an image pickup apparatus, and a method of controlling the image processing apparatus.

In a first aspect of the present invention, there is provided an image processing apparatus comprising an image combining unit configured to generate a combined image, by setting one of a plurality of images as a basic image, and disposing a moving image generated from the plurality of images in a moving image area which is designated in part of the basic image to thereby perform image combining, a display unit configured to display the basic image, a setting unit configured to set a still area in part of the basic image, and a designation unit configured to designate the moving image area, according to a touch operation performed on a display surface of the display unit on which the basic image is displayed, wherein in a case where the moving image area is designated in a manner overlapping the still image, the image combining unit performs image combining processing by deleting the overlapping area from the moving image area.

In a second aspect of the present invention, there is provided an image pickup apparatus comprising a photographing unit configured to temporally sequentially perform photographing, an image combining unit configured to generate a combined image, by setting one of a plurality of images as a basic image, and disposing a moving image generated from the plurality of images in a moving image area which is designated in part of the basic image to thereby perform image combining, wherein the plurality of images are images acquired through photographing performed by the photographing unit, a display unit configured to display the basic image, a setting unit configured to set a still area in part of the basic image, and a designation unit configured to designate the moving image area, according to a touch operation performed on a display surface of the display unit on which the basic image is displayed, wherein in a case where the moving image area is designated in a manner overlapping the still image, the image combining unit performs image combining processing by deleting the overlapping area from the moving image area.

In a third aspect of the present invention, there is provided a method of controlling an image processing apparatus, comprising generating a combined image, by setting one of a plurality of images as a basic image, and disposing a moving image generated from the plurality of images in a moving image area which is designated in part of the basic image to thereby perform image combining, displaying the basic image, setting a still area in part of the basic image, designating the moving image area, according to a touch operation performed on a display surface of a display unit on which the basic image is displayed, and performing, in a case where the moving image area is designated in a manner overlapping the still image, image combining processing by deleting the overlapping area from the moving image area.

According to the present invention, it is possible to properly set a moving image area according to an image.

Further features of the present invention will become apparent from the following description of exemplary embodiments (with reference to the attached drawings).

BRIEF DESCRIPTION OF THE DRAWINGS

FIGS. 4A to 4C are diagrams useful in explaining an example of calculation of a masking priority area, performed in the process in FIG. 3, in which FIG. 4C shows an example of the masking priority area.

FIGS. 5A to 5C are diagrams useful in explaining update of the moving image area, performed in the process in FIG. 3, in which

FIGS. 7A to 7D are diagrams useful in explaining update of a moving image area, performed by an image pickup apparatus (digital camera) as an image processing apparatus according to a second embodiment of the present invention, in which

FIGS. 8A to 8C are diagrams useful in explaining setting of a moving image area by the conventional method of generating a still-and-moving image, in which FIG. 8A shows setting of the moving image area.

DESCRIPTION OF THE EMBODIMENTS

The present invention will now be described in detail below with reference to the accompanying drawings showing embodiments thereof.

Figure 1:
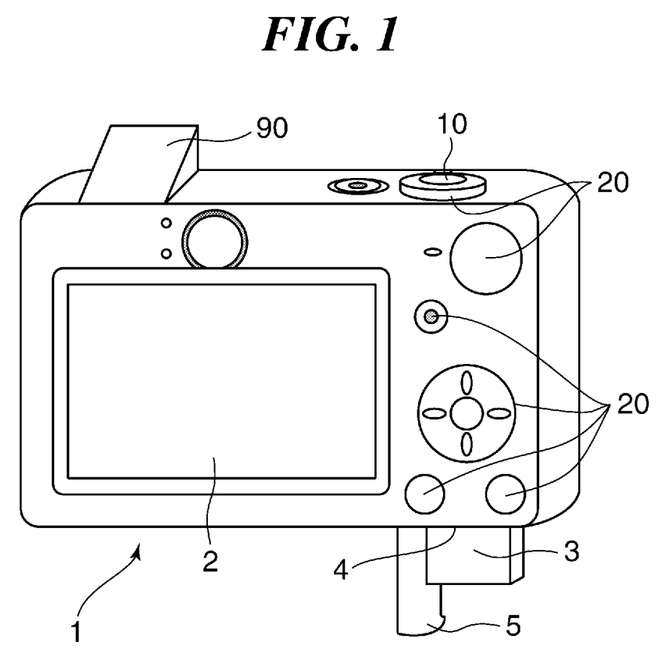
FIG. 1 is a perspective view of the appearance of an image pickup apparatus (digital camera) as an image processing apparatus according to a first embodiment of the present invention, as viewed from the rear.

FIG. 1 is a perspective view of the appearance of an image pickup apparatus as an image processing apparatus according to a first embodiment of the present invention, as viewed from the rear.

The image pickup apparatus shown in FIG. 1 by way of example is a digital camera (hereinafter simply referred to as the camera) 1, and has a camera housing provided with a display section 2, such as an LCD, on a rear surface thereof. This display section 2 displays an image obtained through photographing and various information. A touch panel is disposed on the display section 2, and therefore, the display section 2 also functions as a console section that receives user's operations.

The camera housing has an upper surface provided with a shutter button 10. A photographing instruction is provided by operating the shutter button 10. An operation section 20 is arranged on the right side of the display section 2 on the rear surface of the camera housing. The operation section 20 includes operation members, such as various switches, and buttons for receiving various operations from a user.

The camera housing is formed with a recording medium slot 4 for accommodating a recording medium 3, and when a cover portion 5 is closed after the recording medium 3 is accommodated in the recording medium slot 4, the recording medium 3 is enabled to communicate with the camera 1. As an example of the recording medium 3, a memory card or a hard disk is used.

A flash unit 90 is arranged on the upper surface of the camera housing, and in flash photographing, the flash unit 90 emits light (illuminates) by discharging electric charges accumulated e.g. in an electrolytic capacitor (not shown).

Figure 2:
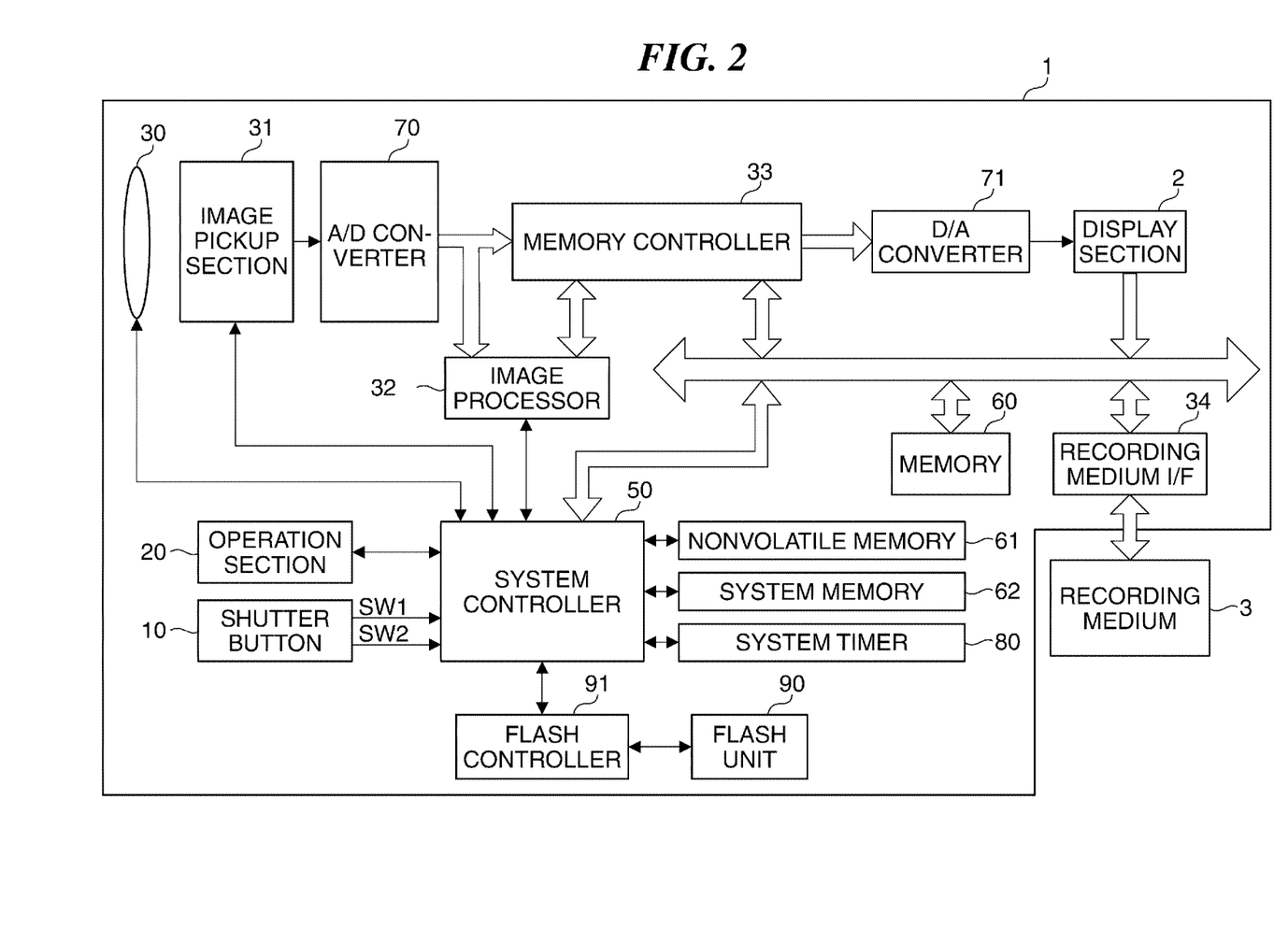
FIG. 2 is a block diagram of the digital camera shown in FIG. 1.

FIG. 2 is a block diagram of the camera 1 shown in FIG. 1.

The camera 1 is provided with a photographic lens unit (hereinafter simply referred to as the photographic lens) 30, which includes a zoom lens and a focus lens.

An optical image (object image) having passed through the photographic lens 30 is formed on an image pickup section 31. The image pickup section 31 includes an image pickup device, such as a CCD or CMOS image sensor, and outputs an electric signal (analog signal) corresponding to the optical image.

An analog-to-digital (A/D) converter 70 receives the analog signal output from the image pickup section 31, and converts the received analog signal to a digital signal. An image processor 32 performs predetermined image processing, such as pixel interpolation processing, resize processing such as size reduction, and color conversion processing, on the digital signal output from the A/D converter 70 or image data output from a memory controller 33.

Further, the image processor 32 performs predetermined calculation processing using image data obtained through photographing. Then, a system controller 50 performs exposure control and ranging control based on results of the calculation processing. According to these controls, AF (Auto Focus) processing, AE (Auto Exposure) processing, flash light control processing, and EF (flash pre-emission) processing are performed using a TTL (Through The Lens) system.

Further, the image processor 32 performs predetermined calculation processing using image data obtained through photographing, and performs AWB (Auto White Balance) processing using the TTL system based on the calculation result. Then, the image processor 32 performs combining processing for combining a plurality of images and processing for generating a still-and-moving image, as will be described hereinafter.

The digital signal output from the A/D converter 70 is written into a memory 60 as image data via the image processor 32 and the memory controller 33, or via the memory controller 33. The memory 60 stores image data obtained through photographing, and further stores display image data to be displayed on the display section 2.

The memory 60 has sufficient storage capacity to store a predetermined number of still images, and predetermined time period of moving images and voice.

The memory 60 also functions as a memory for displaying images (video memory), and the display image data stored in the memory 60 is converted to an analog signal by a digital-to-analog (D/A) converter 71, and the analog signal is sent to the display section 2. This cause an image corresponding to the display image data stored in the memory 60 to be displayed on the display section 2.

Note that if the image data accumulated in the memory 60 is converted from digital to analog by the D/A converter 71, and is sequentially transferred to the display section 2 for display, the display section 2 functions as a so-called viewfinder and can thereby perform through image display.

A nonvolatile memory 61 is an electrically erasable and recordable memory, and for example, an EEPROM is used. The nonvolatile memory 61 stores constants, programs, and the like, for the operation of the system controller 50. These programs include a program for performing a photographing process, described hereinafter with reference to FIG. 3.

The system controller 50 controls the overall operation of the camera 1. The system controller 50 performs the processes, described hereinafter, by executing the programs stored in the above-mentioned nonvolatile memory 61.

A system memory 62 is e.g. a RAM, and the constants, variables, programs, and the like which are read out from the nonvolatile memory 61, for the operation of the system controller 50, are loaded into the system memory 62. Further, the system controller 50 performs display control by controlling the memory 60, the display section 2, and so forth.

When the shutter button 10 is operated halfway, i.e. when the shutter button 10 is subjected to so-called "half press" (photographing preparation instruction), a first shutter switch is switched on to send a first shutter switch signal SW1 to the system controller 50.

The system controller 50 starts AF processing, AE processing, AWB processing, flash light control processing, EF processing, and so forth in response to the first shutter switch signal SW1.

When the shutter button 10 is fully operated, i.e. when the shutter button 10 is subjected to so-called "full press" (photographing instruction), a second shutter switch is switched on to send a second shutter switch signal SW2 to the system controller 50.

The system controller 50 starts a sequence of the operations of the photographing process from the reading of the signal from the image pickup section 31 to the writing of image data into the recording medium 3 in response to the second shutter switch signal SW2.

The operation members included in the operation section 20 each have a function of serving as one of various function buttons which are assigned to the operation members on a scene-by-scene basis as required e.g. by selective operation of various function icons displayed on the display section 2. Examples of the function buttons include a termination button, a backward button, an image forward button, a jump button, a narrow-down button, an attribute change button, a photographing mode change button, and a menu button.

For example, when the menu button is pressed, the system controller 50 displays a menu screen for making various settings, on the display section 2. Then, a user can intuitively make the various settings using a four-direction button (an up button, a down button, a right button, and a left button in a cross arrangement), and a SET button while referring to the menu screen displayed on the display section 2.

The display section 2 is provided with a touch panel that is capable of detecting a contact (touch). The touch panel and the display section 2 can be integrally formed with each other. For example, the touch panel is configured such that it has a light transmittance which does not hinder the display on the display section 2, and is disposed on an upper layer of the display surface of the display section 2. Further, input coordinates on the touch panel and display coordinates on the display section 2 are associated with each other.

This makes it possible to form a GUI (graphic user interface) which enables a user to directly operate the screen displayed on the display section 2.

As the touch panel, a resistance film type, an electrostatic capacitance type, a surface elastic wave type, an infrared type, an electromagnetic induction type, an image recognition type, an optical sensor type, or the like, is employed.

A recording medium interface 34 is an interface for the recording medium 3, such as a memory card or a hard disk. The recording medium 3 records image data obtained through photographing, and so on.

A system timer 80 is a time measuring section for measuring time. A flash controller 91 controls the timing of light emission (illumination) from the flash unit 90 under the control of the system controller 50.

In the following description, an image obtained by combining a still image and a moving image to perform visual expression such that only part of the still image appears to be moving in the combined image is referred to as a still-and-moving image, and further, an area in which motion occurs in the still-and-moving image is referred to as a moving image area. Further, an area which is still in the still-and-moving image is referred to as a still area.

Further, here, images which are continuously photographed are used as a moving image, the flash unit 90 is caused to emit light in synchronism with photographing of the first frame of the moving image, and the second and subsequent frames are photographed without light emission. Then, a still-and-moving image is generated using the image of the first frame (illuminated image) obtained with light emission from the flash unit 90 as a basic image.

Further, an area illuminated with a flash light is detected based on the basic image and the image of the second frame, and the area illuminated with the flash light is set as a masking priority area, referred to hereinafter. This masking priority area is an area in which a still image is preferentially displayed. Further, a setting of the moving image area is made by designating an area by a touch operation on the screen of the touch panel.

Note that in the following description, description of a process which is normally performed, such as aperture correction for correcting the influence due to a finite size of aperture, is omitted.

Figure 3:
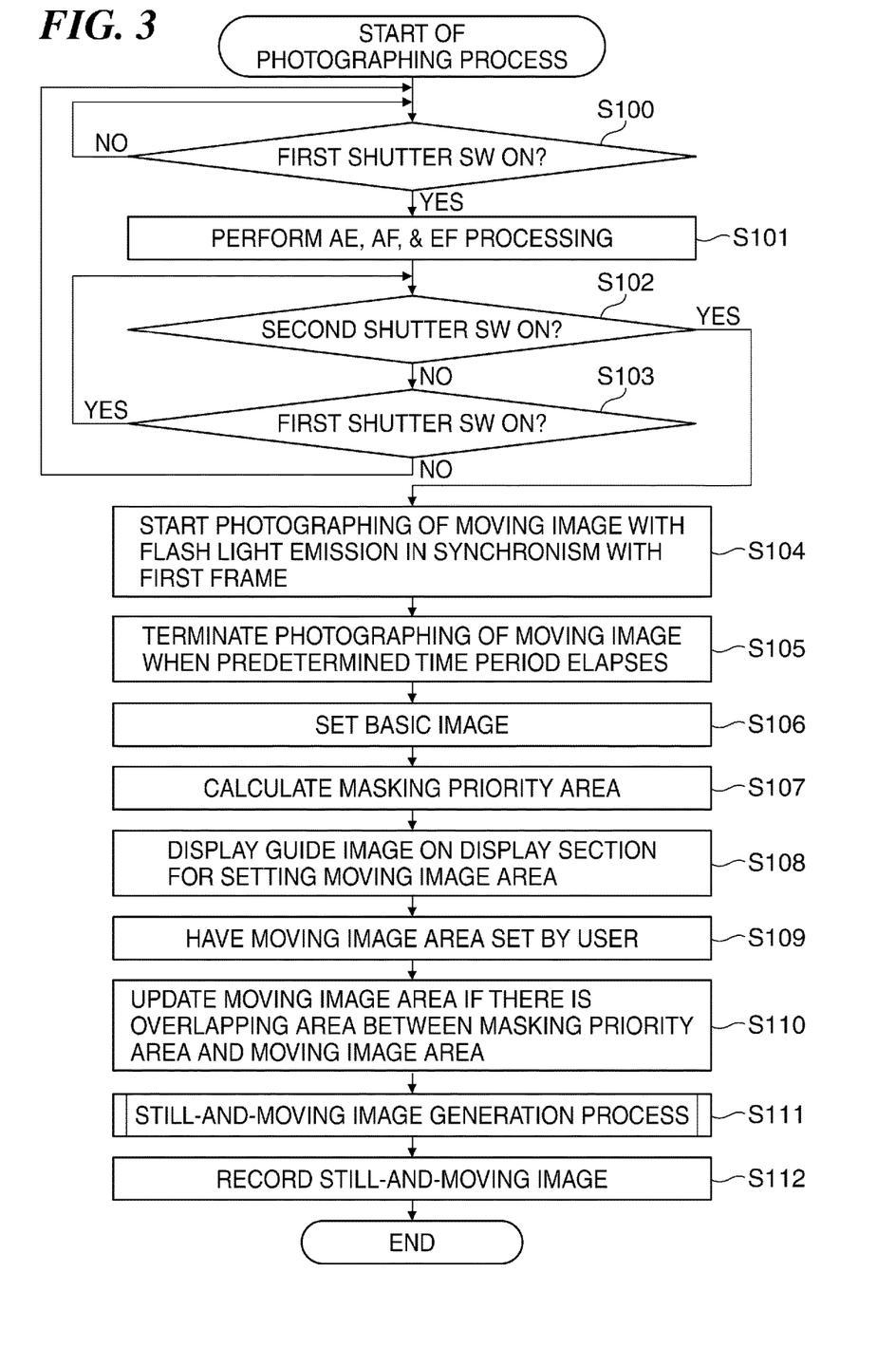
FIG. 3 is a flowchart of a photographing process performed by the digital camera shown in FIG. 2.

FIG. 3 is a flowchart of the photographing process performed by the camera shown in FIG. 2. The photographing process in FIG. 3 is performed under the control of the system controller 50.

Now, when a flash light emission still-and-moving image generation mode is selected by a photographing mode-switching switch provided on the operation section 20, the system controller 50 starts the photographing process in FIG. 3.

First, the system controller 50 determines whether or not the first shutter switch is switched on (step S100). If the first shutter switch is not switched on (NO to the step S100), the system controller 50 waits.

On the other hand, if the first shutter switch is switched on (YES to the step S100), the system controller 50 performs AE processing, AF processing, and EF processing (step S101).

Then, the system controller 50 determines whether or not the second shutter switch is switched on (step S102). If the second shutter switch is not switched on (NO to the step S102), the system controller 50 determines whether or not the first shutter switch is in the on state (step S103).

If it is determined that the first shutter switch is not in the on state, i.e. if it is determined that the shutter button 10 is not pressed (NO to the step S103), the system controller 50 returns to the step S100. On the other hand, if the first shutter switch is in the on state (YES to the step S103), the system controller 50 returns to the step S102.

If the second shutter switch is switched on (YES to the step S102), the system controller 50 controls the flash controller 91 to cause the flash unit 90 to emit light in synchronism with the first frame of the moving image, and starts moving image photographing (step S104).

At this time, the system controller 50 performs photographing such that the first frame and the second frame of the moving image becomes equal in exposure level in a background area which is not illuminated with the flash light. Further, the flash controller 91 controls the amount of light emitted from the flash unit 90 based on the result of EF processing.

Next, the system controller 50 measures the photographing time using the system timer 80, and when the photographing time measured by the system timer 80 reaches a predetermined time period set by the user, the system controller 50 terminates moving image photographing (step S105). Then, the system controller 50 sets an image of the first frame of the moving image photographed with light emission from the flash unit 90 (hereinafter referred to as the illuminated image) as a basic image (step S106).

Then, the system controller 50 sends the illuminated image (basic image) and an image of the second frame of the moving image photographed without flash light emission (hereinafter referred to as the non-illuminated image) to the image processor 32. Then, the image processor 32 calculates a masking priority area on the basic image in a manner described hereafter (step S107).

Figure 4A:
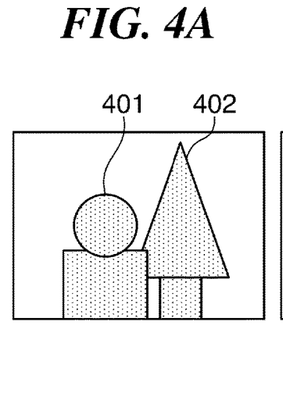
FIG. 4A shows an example of an illuminated image.
Figure 4B:
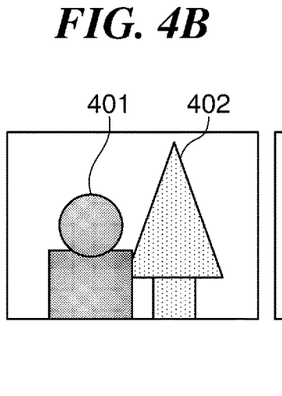
FIG. 4B shows an example of a non-illuminated image.
Figure 4C:
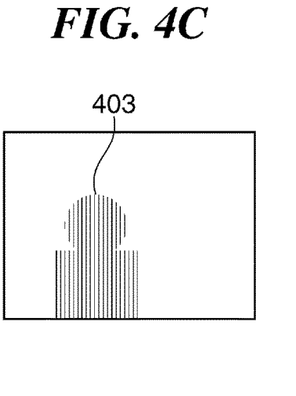

FIGS. 4A to 4C are diagrams useful in explaining an example of calculation of the masking priority area, performed in the process in FIG. 3. FIG. 4A shows an example of the illuminated image, and FIG. 4B shows an example of the non-illuminated image. Further, FIG. 4C shows an example of the masking priority area.

Referring to FIGS. 4A and 4B, the density level of hatching and dots represents light and shade (i.e. luminance) of an image. Further, here, it is assumed that a person 401 and an illumination 402 have been photographed as objects.

The image processor 32 calculates a difference in luminance (luminance difference) for each corresponding pixels between the illuminated image and the non-illuminated image. Then, the image processor 32 determines a pixel having a luminance difference which is larger than a predetermined threshold value as a pixel illuminated with the flash light. The image processor 32 performs this determination on all pixels, and sets, according to the result of the determination, the pixels which are determined as the pixels illuminated with the flash light, as the masking priority area.

When the masking priority area is determined according to the illustrated illuminated image and non-illuminated image, a result shown in FIG. 4C is obtained. An area indicated by hatching (vertical lines) appearing in FIG. 4C is the masking priority area, denoted by reference numeral 403. Although in this example, to simplify the explanation, it is assumed that the images are photographed under a condition that a positional displacement does not occur between the images, such as a condition that a tripod is used, but in a case where a positional displacement occurs between the images, such as a case of handheld photographing, it is only required to perform positioning adjustment between the images.

Referring again to FIG. 3, the system controller 50 displays a guide image for setting the moving image area on the display section 2 (step S108).

Note that the display section 2 may continue to display the basic image, or reproduce and display a photographed moving image. Further, the display section 2 may continuously display an image obtained by α-blending the basic image and each of the second and subsequent frames by the image processor 32. Here, it is assumed that the basic image is displayed on the display section 2.

Next, the user touches the display section 2 to thereby set the moving image area in the basic image (step S109).

Figure 5A:
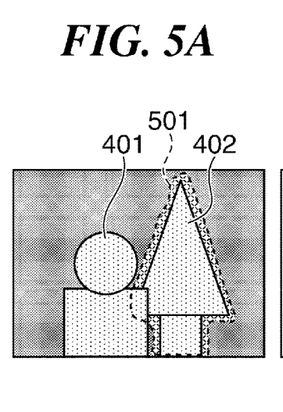
FIG. 5A shows an area designated by a touch operation.
Figure 5B:
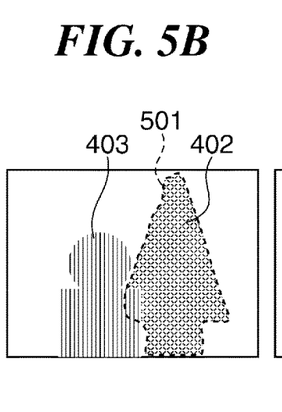
FIG. 5B shows a masking priority area and a moving image area.
Figure 5C:
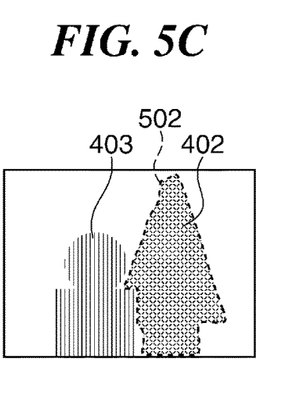
FIG. 5C shows an updated state of the moving image area.

FIGS. 5A to 5C are diagrams useful in explaining update of the moving image area, performed in the process in FIG. 3. FIG. 5A shows an area designated by a touch operation, and FIG. 5B shows a masking priority area and a moving image area. Further, FIG. 5C shows update of the moving image area.

Referring to FIG. 5A, the basic image includes the person 401 and the illumination 402 as objects, and the person 401 and the illumination 402 are close to each other.

It is assumed that with a view to setting the illumination 402 as the moving image area, the user performs the touch operation to thereby designate a moving image area 501 indicated by broken lines. At this time, to make the user recognize the area touched by the user, the system controller 50 displays the area by changing the display color and in a state superimposed on the guide image (i.e. the basic image in this example).

The system controller 50 determines whether or not there is an area that overlaps between the masking priority area 403 and the moving image area 501. Then, if there is an area that overlaps between these areas (referred to as the overlapping area), the system controller 50 controls the image processor 32 to delete the overlapping area from the moving image area 501 to thereby update the moving image area 501 (step S110).

In the illustrated example in FIG. 5B, the masking priority area 403 and the moving image area 501 partially overlap, and hence there is an overlapping area between the masking priority area 403 and the moving image area 501. Therefore, as mentioned above, the moving image area 501 is updated by deleting the overlapping area from the moving image area 501, whereby a moving image area 502 is obtained as shown in FIG. 5C.

After execution of the step S110, the image processor 32 generates a still-and-moving image based on the basic image, the moving image, and the moving image area, under the control of the system controller 50, as described hereinafter (step S111). Then, the system controller 50 records the still-and-moving image in the recording medium 3 (step S112), followed by terminating the photographing process.

Figure 6:
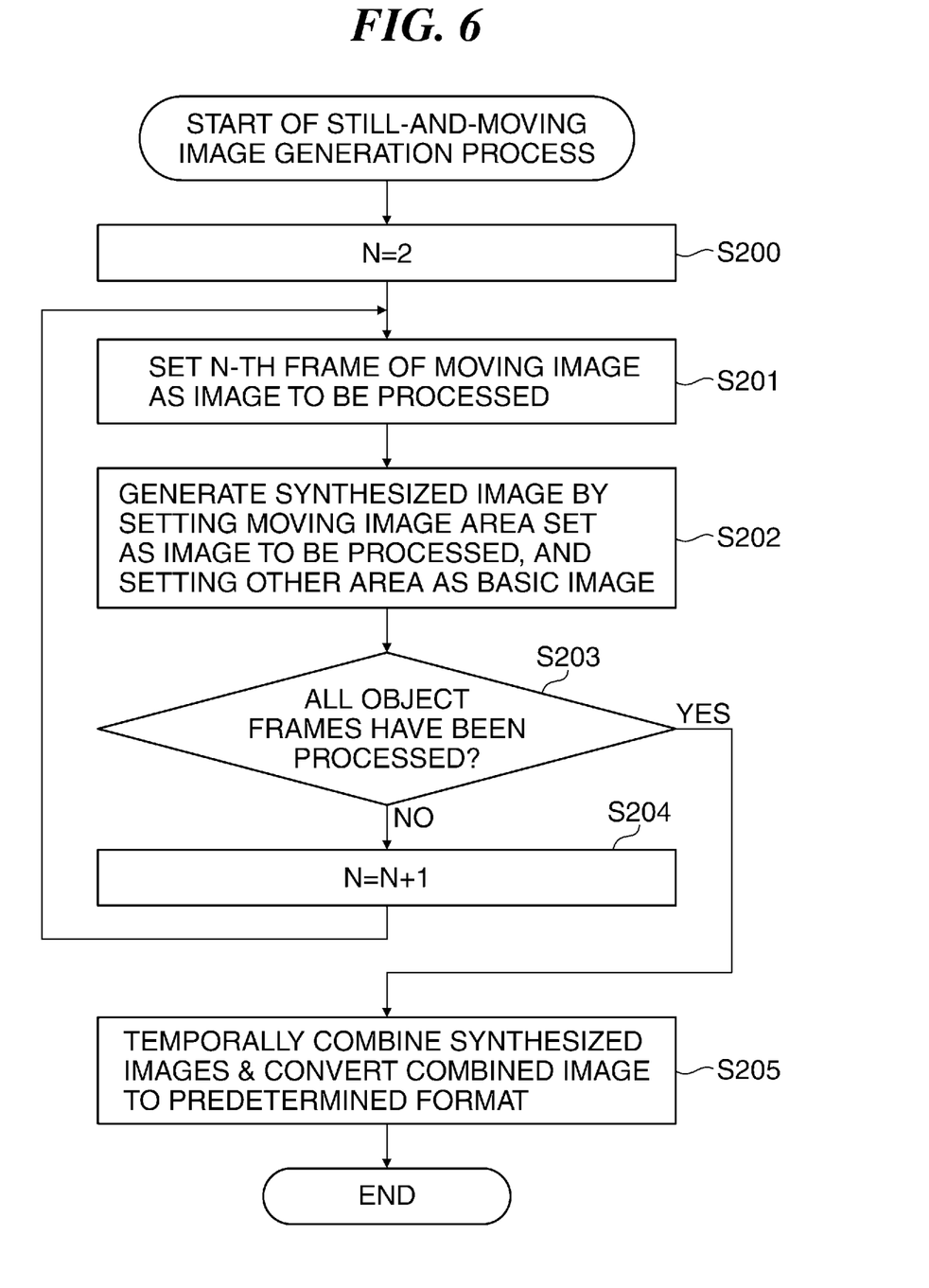
FIG. 6 is a flowchart of a still-and-moving image generation process performed in a step of the process in FIG. 3.

FIG. 6 is a flowchart of the still-and-moving image generation process performed in the process in FIG. 3.

When the still-and-moving image generation process is started, first, the system controller 50 sets N (N represents the frame number of a moving image to be processed) to 2 (step S200). Then, the system controller 50 sets the N-th frame of the moving image as the image to be processed (step S201).

Then, the image processor 23 generates a combined image in which the moving image area is formed by the image to be processed and an area other than the moving image area is formed by the basic image, under the control of the system controller 50 (step S202). Then, the system controller 50 determines whether or not combining processing has been performed on all frames to be processed from the second frame to the final frame of the moving image (step S203).

If combining processing has not been performed on all frames to be processed (NO to the step S203), the system controller 50 increments the frame number N (N=N+1) (step S204), and returns to the step S201.

On the other hand, if combining processing has been performed on all frames to be processed (YES to the step S203), the image processor 32 generates combined images by setting the basic image as the first frame, and as for the second and subsequent frames, temporally combining the combined image of each frame, under the control of the system controller 50. Then, the image processor 32 converts each combined image to a predetermined format, such as GIF or MPEG, to thereby generate a still-and-moving image (step S205). Then, the system controller 50 terminates the still-and-moving image generation process.

Thus, the image obtained by temporally combining the combined images and converting the combined image to the predetermined format is the still-and-moving image. In a case where the obtained image is converted to a format which makes it possible to set looping of the image, such as GIF, the looping of the image may be set.

As described above, in the first embodiment of the present invention, the moving image area is updated by deleting the overlapping area from the masking priority area 403. With this processing, when setting a moving image area in an image according to a touch operation, even when a portion which should form a still area is touched by accident, it is possible to easily set the moving image area as intended.

Next, a description will be given of an image pickup apparatus (digital camera) as an image processing apparatus according to a second embodiment of the present invention. Note that the camera according to the second embodiment has the same configuration as that of the camera shown in FIGS. 1 and 2. Further, in the camera according to the second embodiment as well, the photographing process is performed in the same manner as described with reference to FIG. 3.

In the second embodiment, the system controller 50 divides the basic image into a predetermined number of block areas, and displays the basic image on the display section 2 in the divided state. Then, the user touches the image displayed on the display section 2 to thereby set the moving image area.

Figure 7A:
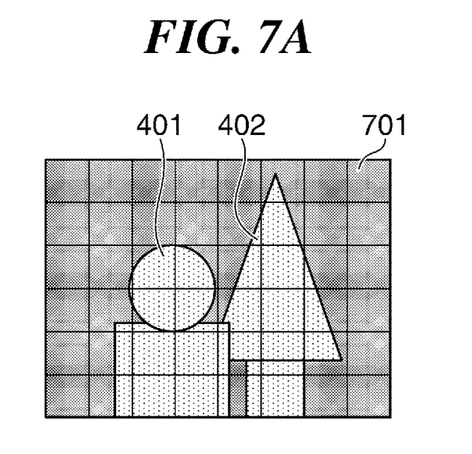
FIG. 7A shows a state where a basic image is divided into block areas.
Figure 7B:
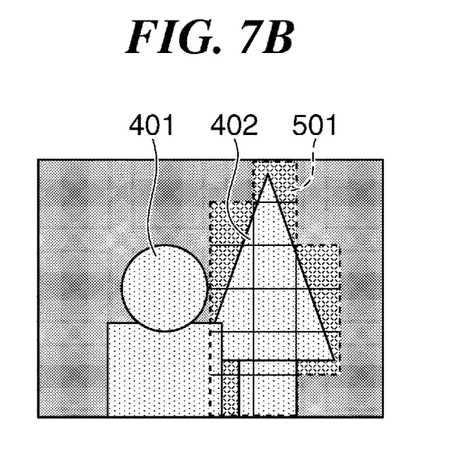
FIG. 7B shows a state where a user has designated a moving image area by a touch operation.
Figure 7C:
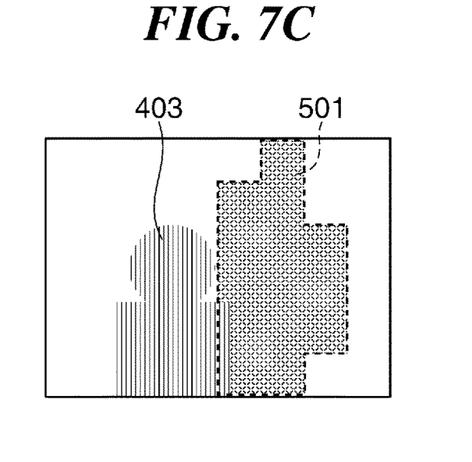
FIG. 7C shows a masking priority area and the moving image area.
Figure 7D:
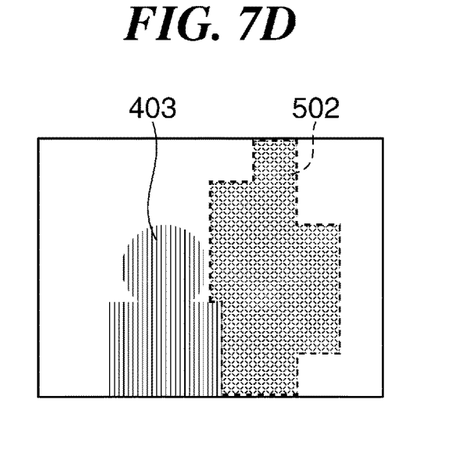
FIG. 7D shows a state where the moving image area has been updated.

FIGS. 7A to 7D are diagrams useful in explaining update of the moving image area, performed by the camera according to the second embodiment. FIG. 7A shows a state where the basic image is divided into the block areas, and FIG. 7B shows a state where a user has designated the moving image area by a touch operation. Further, FIG. 7C shows a masking priority area and the moving image area, and FIG. 7D shows a state where the moving image area has been updated.

As mentioned above, the system controller 50 divides the basic image into a predetermined number of block areas 701 (see FIG. 7A). This processing is performed e.g. in the step S108 in FIG. 3. When the user touches a block area, the system controller 50 sets the touched block area as a moving image area. That is, the system controller 50 sets all of the block areas touched by the user as the moving image area 501 indicated by broken lines in FIG. 7B.

If there is an overlapping area between the moving image area 501 set as above and the above-mentioned masking priority area 403 (see FIG. 7C), the system controller 50 deletes the overlapping area from the moving image area 501 to thereby update the moving image area 501 to obtain the moving image area 502 (see FIG. 7D).

As described above, in the second embodiment of the present invention, the basic image is divided into the plurality of block areas, and the moving image area is set on a block area-by-block area basis. By dividing the basic image into the plurality of block areas, it is possible to reduce the number of times of touch operation by the user e.g. in a case where it is not necessary to finely set the moving image area, which reduces time and effort of the user.

Although in the embodiments of the present invention, the process for generating a still-and-moving image from a moving image has been described, a still-and-moving image can be similarly generated by acquiring a plurality of temporally sequential images, such as still images obtained by continuous photographing, or images obtained by combining still images and a moving image.

Further, although in these embodiments, when setting a masking priority area based on an illuminated image and a non-illuminated image, the masking priority area is set according to a luminance difference, any other parameter can be used insofar as pixels illuminated with a flash light can be detected. For example, pixels illuminated with a flash light may be detected based on one or a combination of a luminance difference, a color difference component difference, a luminance ratio, and a color difference component ratio between an illuminated image and a non-illuminated image.

Further, although in the above-described example, an illuminated image is set as the basic image, a combined image obtained by α-blending an illuminated image and a non-illuminated image may be set as the basic image. Further, although an area illuminated with a flash light is set as the masking priority area, by providing a detection section for detecting a human body (e.g. a face), an area from which a human body is detected may be set as the masking priority area, according to a result of detection by the detection section.

In addition, although in the above-described example, after the user has set a moving image area, the moving image area is updated if there is an overlapping area between the masking priority area and the moving image area, the moving image area may be updated on a real-time basis when the user inputs the moving image area.

For example, a masking priority area may be displayed on the display section 2 in a color different from the moving image area in a state superimposed on a guide image, and the moving image area may be updated on a real-time basis when the user designates the moving image area, to thereby update the guide image.

As is clear from the above description, in the illustrated example in FIG. 2, the image processor 32 and the system controller 50 function as a setting unit, a designation unit, an update unit, and a combining unit. Further, the photographic lens 30, the image pickup section 31, the A/D converter 70, and the system controller 50 function as a photographing unit, and the system controller 50, the flash controller 91, and the flash unit 90 function as a light emission unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-152911 filed Jul. 28, 2014, which is hereby incorporated by reference herein in its entirety.

What is claimed is:

1. An image processing apparatus comprising:
    an image combining unit configured to generate a combined image, by setting one of a plurality of images as a basic image, and disposing a moving image generated from the plurality of images in a moving image area which is designated in part of the basic image to thereby perform image combining;
    a display unit configured to display the basic image;
    a setting unit configured to set a still area in part of the basic image; and
    a designation unit configured to designate the moving image area, according to a touch operation performed on a display surface of said display unit on which the basic image is displayed,
    wherein in a case where the moving image area is designated in a manner overlapping the still area, said image combining unit performs image combining processing by deleting the overlapping area from the moving image area.

2. The image processing apparatus according to claim 1, wherein the plurality of images are temporally sequential images.

3. The image processing apparatus according to claim 1, further comprising a photographing unit configured to photograph the plurality of images, and
    a light emission unit configured to emit light in synchronism with photographing performed by said photographing unit, and
    wherein said setting unit sets the still area, based on an illuminated image obtained through photographing with light emission by said light emission unit, and a non-illuminated image obtained through photographing without light emission by said light emission unit.

4. The image processing apparatus according to claim 3, wherein the basic image is the illuminated image.

5. The image processing apparatus according to claim 3, wherein said image combining unit generates the combined image, using the non-illuminated image for the moving image area.

6. The image processing apparatus according to claim 3, wherein said setting unit sets the still area using at least one of a luminance difference, a color difference component difference, a luminance ratio, and a color difference component ratio, between the illuminated image and the non-illuminated image.

7. The image processing apparatus according to claim 3, wherein said setting unit calculates a luminance difference between the illuminated image and the non-illuminated image for each of pixels corresponding to each other, and sets pixels which are larger in the calculated luminance difference than a predetermined threshold value, as the still area.

8. The image processing apparatus according to claim 1, further comprising a detection unit configured to detect a person in each of the plurality of images, and
    wherein said setting unit sets the still area according to a result of detection performed by said detection unit.

9. The image processing apparatus according to claim 1, wherein said display unit displays the basic image in a state divided into a predetermined number of block areas, and
    Wherein said designation unit designates the moving image area by selecting from the block areas basis by the touch operation.

10. An image pickup apparatus comprising:
    a photographing unit configured to temporally sequentially perform photographing;
    an image combining unit configured to generate a combined image, by setting one of a plurality of images as a basic image, and disposing a moving image generated from the plurality of images in a moving image area which is designated in part of the basic image to thereby perform image combining, wherein the plurality of images are images acquired through photographing performed by said photographing unit;
    a display unit configured to display the basic image;
    a setting unit configured to set a still area in part of the basic image; and
    a designation unit configured to designate the moving image area, according to a touch operation performed on a display surface of said display unit on which the basic image is displayed,
    wherein in a case where the moving image area is designated in a manner overlapping the still area, said image combining unit performs image combining processing by deleting the overlapping area from the moving image area.

11. The image pickup apparatus according to claim 10, further comprising a light emission unit configured to emit light in synchronism with photographing performed by said photographing unit, and
    wherein said setting unit sets the still area, based on an illuminated image obtained through photographing with light emission by said light emission unit, and a non-illuminated image obtained through photographing without light emission by said light emission unit.

12. The image pickup apparatus according to claim 10, wherein the basic image is the illuminated image.

13. The image pickup apparatus according to claim 10, wherein said image combining unit generates the combined image, using the non-illuminated image for the moving image area.

14. The image pickup apparatus according to claim 10, wherein said setting unit calculates a luminance difference between the illuminated image and the non-illuminated image for each of pixels corresponding to each other, and sets pixels which are larger in the calculated luminance difference than a predetermined threshold value, as the still area.

15. A method of controlling an image processing apparatus, comprising:
   generating a combined image, by setting one of a plurality of images as a basic image, and disposing a moving image generated from the plurality of images in a moving image area which is designated in part of the basic image to thereby perform image combining;
   displaying the basic image;
   setting a still area in part of the basic image;
   designating the moving image area, according to a touch operation performed on a display surface of a display unit on which the basic image is displayed; and
   performing, in a case where the moving image area is designated in a manner overlapping the still area, image combining processing by deleting the overlapping area from the moving image area.

* * * * *